Figure 4:
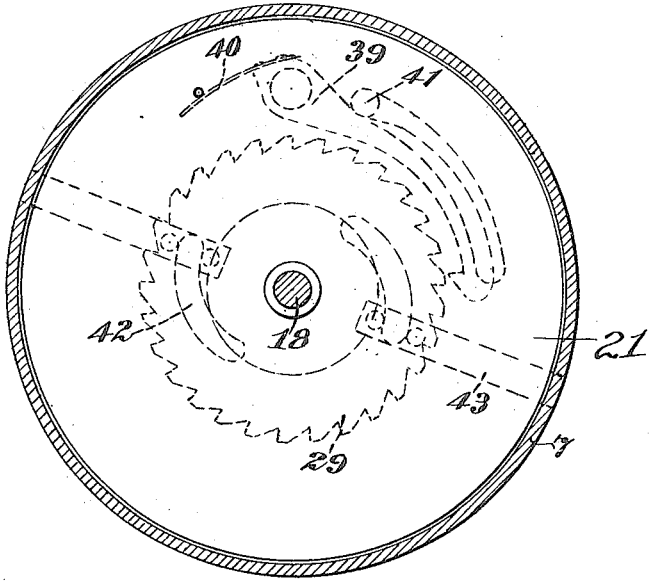

J. E. GUNDRY.
TROLLEY RETRIEVER.
APPLICATION FILED SEPT. 3, 1912.
1,136,228.
Patented Apr. 20, 1915.
4 SHEETS—SHEET 1.
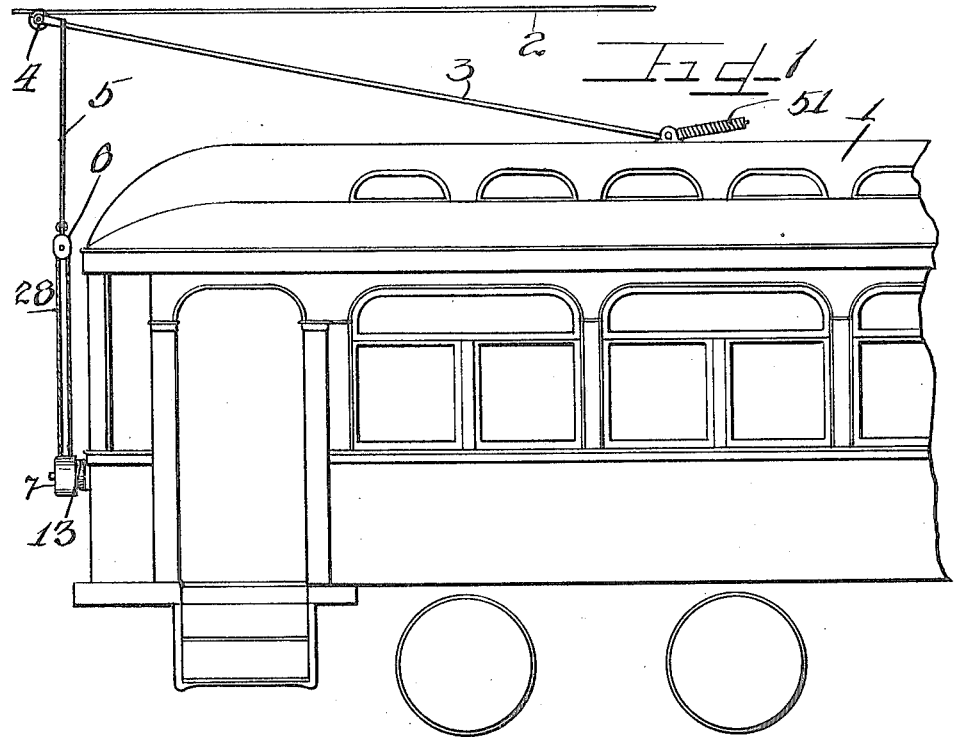
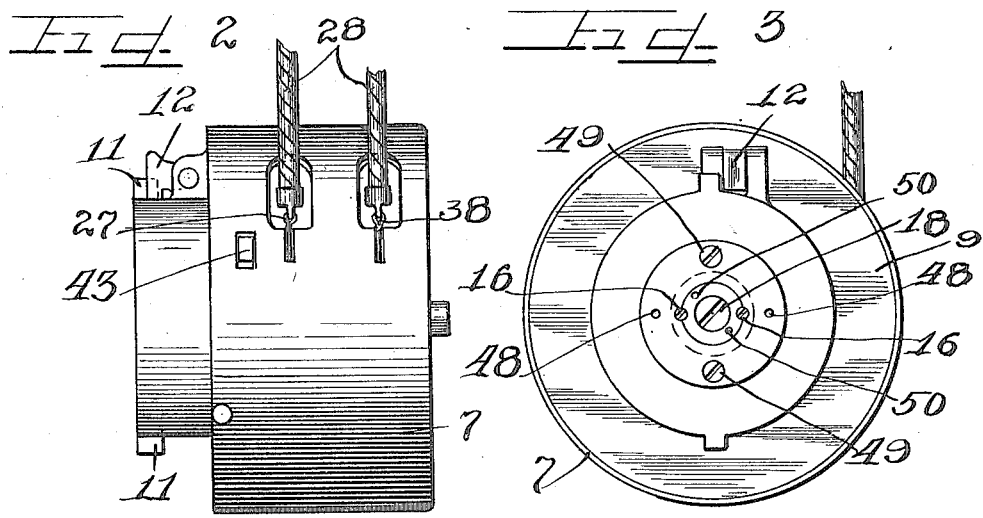

J. E. GUNDRY.
TROLLEY RETRIEVER.
APPLICATION FILED SEPT. 3, 1912.

1,136,228.

Patented Apr. 20, 1915.
4 SHEETS—SHEET 2.

WITNESSES
J. W. Angell
Charles W. Hill Jr.

INVENTOR
James E. Gundry
by Charles W. Niles
Atty.

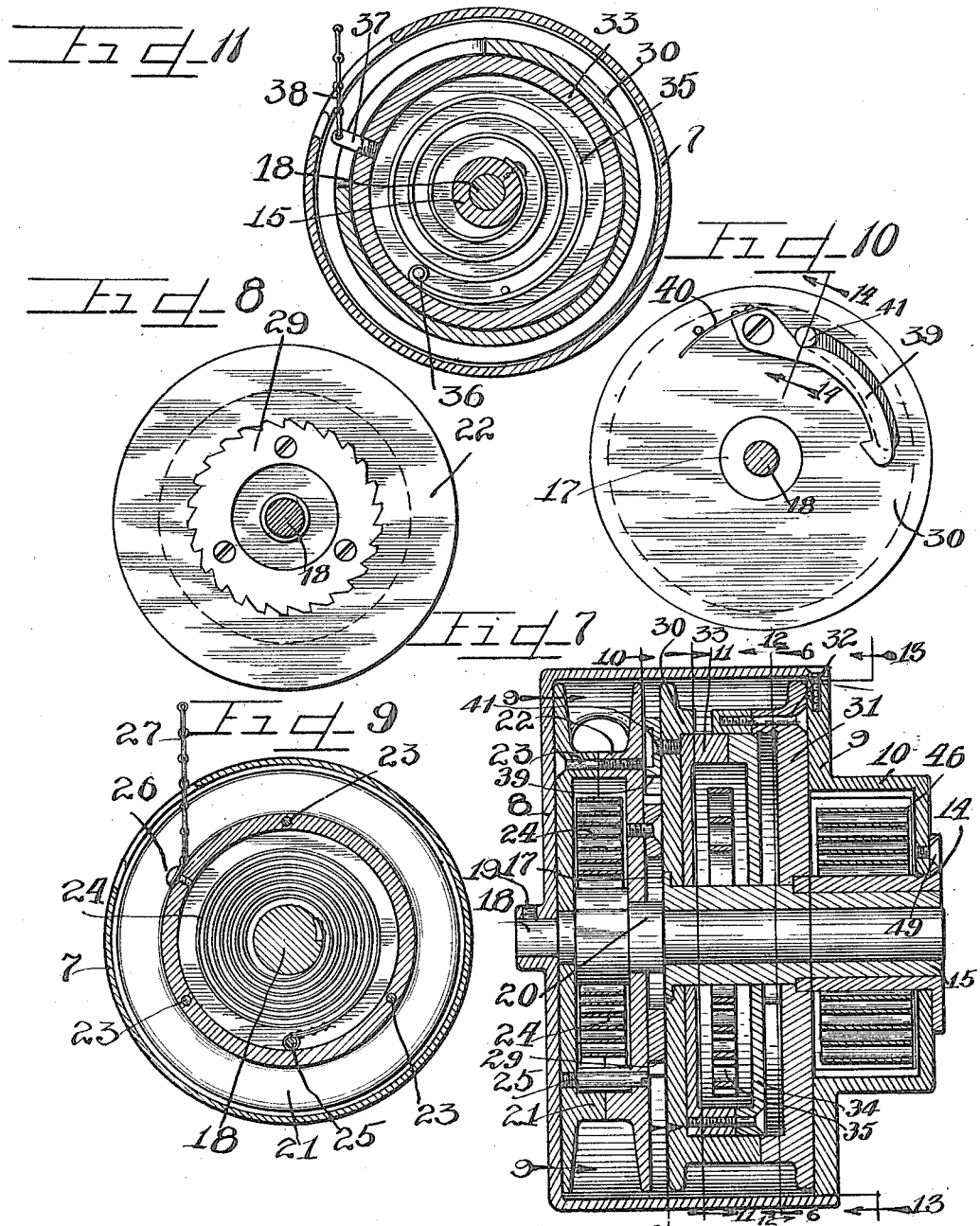

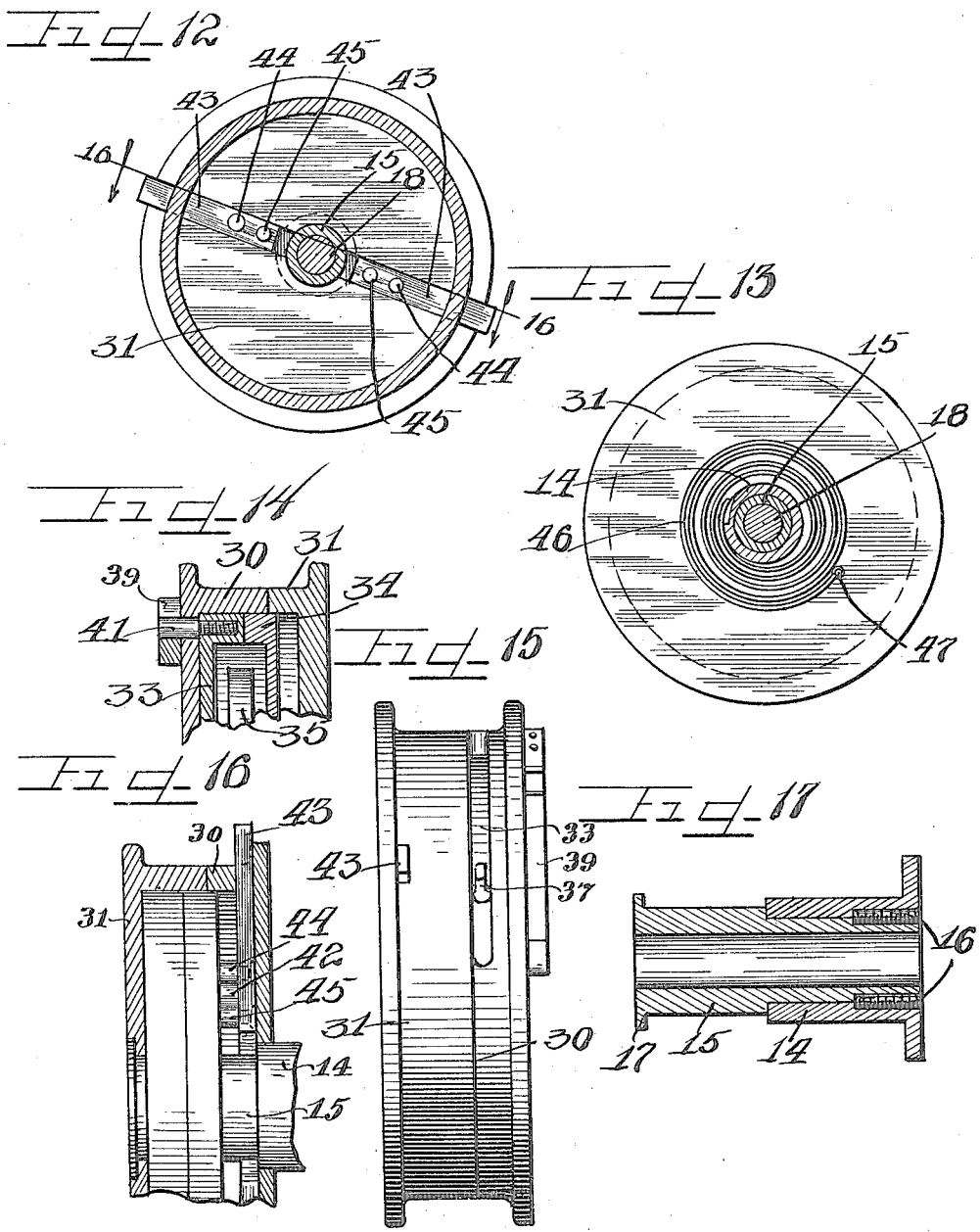

UNITED STATES PATENT OFFICE.

JAMES E. GUNDRY, OF FLINT, MICHIGAN, ASSIGNOR OF ONE-HALF TO CHARLES E. CRUSOE, OF FLINT, MICHIGAN.

TROLLEY-RETRIEVER.

1,136,228.  Specification of Letters Patent.  Patented Apr. 20, 1915.

Application filed September 3, 1912. Serial No. 718,178.

*To all whom it may concern:*

Be it known that I, JAMES E. GUNDRY, a citizen of the United States, and a resident of the city of Flint, in the county of Genesee and State of Michigan, have invented certain new and useful Improvements in Trolley-Retrievers; and I do hereby declare that the following is a full, clear, and exact description of the same, reference being had to the accompanying drawings, and to the letters of reference marked thereon, which form a part of this specification.

In the operation of trolley cars considerable damage is frequently occasioned by the slipping of the trolley wheel from the trolley wire, permitting the trolley pole to fly up and strike the guy lines whereby the trolley wire is supported, breaking the same and sometimes causing the trolley wire to fall. Not only is expense occasioned in this manner, but sometimes serious accidents have resulted from the charged trolley wire falling to the street. The various trolley retrievers heretofore used to prevent such accidents are not generally satisfactory, in that too great tension is maintained by most of such devices at all times upon the trolley pole, thereby occasioning imperfect contact at times, or, if set to less tension, the trolley pole is permitted to fly up a considerable distance before the retriever catches the same.

It is an object of this invention to afford a trolley retriever so constructed as to permit the utmost freedom of movement of the trolley pole in its normal operation and use, but so constructed as to instantly catch the trolley pole and arrest its upward movement should the wheel become disengaged from the trolley wire.

It is an object of the invention to afford a construction wherein the retrieving device is constructed double to afford one retrieving reel set at slight tension, and another retrieving and locking reel set at higher tension, and with which the ends of the retrieving line are respectively connected, the bight thereof passing through a suitable sheave secured on the trolley rope.

It is an object of the invention to afford a construction equipped with two retrieving reels, each acting independently under normal conditions, but acting simultaneously to lock from further movement when shock is imparted thereto by a violent jerk on the trolley rope, as occasioned when the trolley wheel slips from the trolley line.

The invention in its preferred form is illustrated in the drawings, and hereinafter more fully described.

Figure 6:
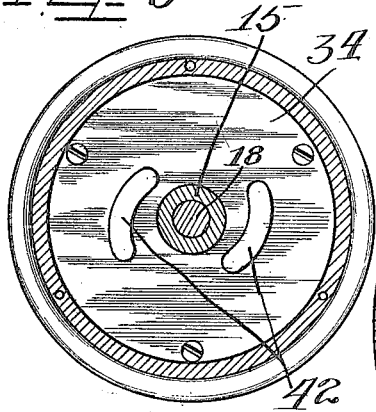
Figure 5:
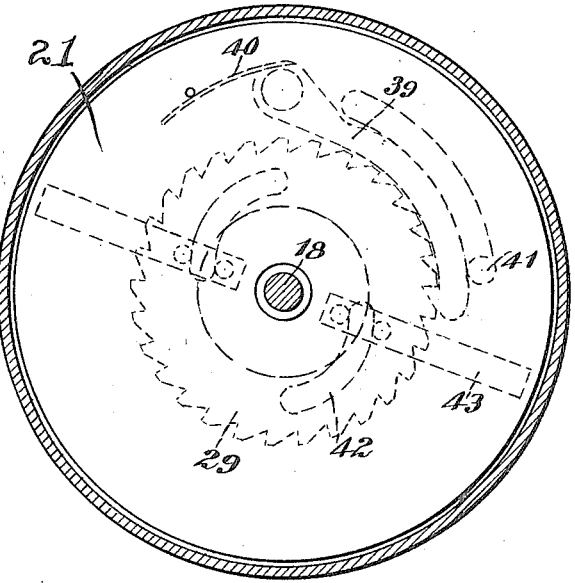

In the drawings: Figure 1 is a fragmentary side elevation of a car equipped with a device embodying my invention. Fig. 2 is a side elevation view of the retriever. Fig. 3 is an end view of the same. Figs. 4 and 5 are diagrammatic sections to illustrate the relation of the mechanism at different points in the operation thereof. Fig. 6 is a reduced section taken on line 6—6 of Fig. 7. Fig. 7 is a central section of the same showing the shaft in elevation. Fig. 8 is a face view of the take up sheave and ratchet wheel thereon, Fig. 9 is a section on line 9—9 of Fig. 7. Fig. 10 is a face view looking oppositely from Fig. 8, that is to say, as indicated by line 10—10 in Fig. 7. Fig. 11 is a section on line 11—11 of Fig. 7. Fig. 12 is a section on line 12—12 of Fig. 7. Fig. 13 is a section on line 13—13 of Fig. 7. Fig. 14 is a section on line 14—14 of Fig. 10. Fig. 15 is an enlarged view in side elevation of the same. Fig. 16 is an enlarged fragmentary section on line 16—16 of Fig. 12. Fig. 17 is a view in longitudinal section of the bearing sleeve illustrated in Fig. 7.

As shown in the drawings: 1 indicates the car, 2 the trolley line, 3 the trolley pole, equipped with a trolley wheel 4, and having the usual trolley rope 5 depending therefrom, said trolley rope being relatively short and having a sheave 6 secured at the lower end thereof. The trolley retriever is contained within a cylindric casing 7 of pressed or cast metal, having one integral head 8, and having a removable head 9 rigidly but removably secured in the other end thereof, said head 9 having a concentric boss or hub 10 thereon, cored to afford an interior spring chamber and provided on opposite sides thereof with lugs 11, and with a latching bolt 12 whereby said hub may be engaged in a suitable retaining socket 13 therefor secured on the rear end of the car below said sheave. Two line apertures are provided through the wall of said casing, as shown in Fig. 2, said apertures being arranged one adjacent the integral head 8 and the other inwardly therefrom, and each being of a size to permit the retrieving line to run therethrough, and slotted downwardly as shown in Fig. 2.

Rigidly secured at the axis of the casing, and projecting inwardly through said boss 10 into the spring chamber is a sleeve 14 which is flanged upwardly on the head of said boss and engaged thereto by means of screws 49 or the like, and which is of a length to extend inwardly beyond the inner face of the removable casing head 9. An inner sleeve, 15, co-axial therewith, is rigidly secured in said sleeve 14 by means of set screws 16 shown in Fig. 17, and is of a length to extend inwardly approximately to or past the middle of the casing, and is provided with a peripheral flange 17 at its inner end, as shown in Figs. 7, 10 and 17. Journaled in said sleeve 15 and in the head 8 of the casing is a shaft 18 adapted to be rigidly secured in place by means of a set screw 19 extending through the hub of said head, as shown in Fig. 7, into engagement with the shaft. At its opposite end, or that extending through the sleeve 15, said shaft is provided with a slot, as shown in Fig. 3, to permit engagement by a screw-driver or other suitable tool, to rotate the same when said set screw is loosened. An enlargement or collar 20 is provided on said shaft to bear against the inner end of the sleeve 15, and journaled on said shaft between the head 8 and the inner end of said sleeve 15 is a sheave divided centrally and transversely said shaft to afford an outer sheave section 21, and an inner sheave section 22, which are cored to afford an interior spring chamber and are rigidly secured together by means of bolts 23.

A flat spiral spring 24 is rigidly secured at its inner end on said shaft 18, and at its outer end is secured on a pin 25, as shown in Figs 7 and 9. Said sheave is arranged in said casing, as shown in Figs. 7 and 9, with its grooved periphery in alinement with the outer line aperture through the casing, and secured on the rim of the sheave at the bottom of its curved periphery by means of a bolt 26 is a chain 27 which extends through said aperture in the casing and is engaged on one end of the retrieving line 28.

A ratchet wheel, 29, is rigidly secured on the inner face of the sheave section 22, with the teeth thereof directed oppositely from the direction of rotation of said sheave in winding up the retrieving line, as shown in Figs. 8 and 9. A sheave, also divided in a plane transversely the shaft therefor to afford sections 30 and 31, and cored to afford an interior chamber, and the sections thereof rigidly secured together by means of screws or bolts 32, is journaled on the inner end of the sleeve 15, the inner face of said sheave being recessed to receive the flange 17 at the inner end of said sleeve therein, flush with said face. Journaled on said sleeve in the chamber in said sheave is a spring casing also constructed in sections 33 and 34, and within which is a flat spiral spring 35, the inner end of which is rigidly engaged on the sleeve 15, and the outer end of which is engaged on a pin 36 extending transversely the spring chamber as shown in Fig. 11. As shown, the whorls of said spring are directed to correspond with the spring 24 in the sheave first described and shown in Fig. 9. The periphery of the sheave section 30 is slotted for a part of its circumference, and rigidly secured in said spring casing and projecting outwardly through said slot is a bolt 37 at the outer end of which is engaged a chain 38 which is connected with the other end of the retrieving line 28 as shown in Fig. 2, said chains 38 and 27 leading around their respective sheaves both in the same direction. The bight of said retrieving line is engaged through the sheave 6, as shown in Fig. 1.

Pivotally engaged on the face of the section 30 of the inner sheave, which may be termed the retrieving sheave, is a hooked pawl 39 which overlies the periphery of the ratchet 29 on the take-up sheave, and is normally held out of engagement therewith by means of a spring 40, as shown in Fig. 10. The face of said retrieving sheave is slotted, as shown in Fig. 10, and engaged in the spring casing within the retrieving sheave is a pin 41 which projects outwardly through said slot and engages the back of said pawl, which curves upwardly across the slot so that rotation of the spring casing relatively the retrieving sheave in retrieving acts to throw said pawl into engagement, locking both said sheaves together to rotate simultaneously, as indicated by dotted lines in Figs. 4 and 5.

Secured on the outer face 34 of said spring casing, and adjacent the sleeve 15 are outwardly curved and obliquely set or eccentric projections 42, one on each side of the center, and slidably seated in suitable grooves therefor in the inner face of the section 31 of the retrieving sheave are bolts 43 provided at the inner ends thereof with inwardly projecting pins 44 and 45, which engage one on each side of said eccentric projections or cams 42, to retract said bolts simultaneously with the engagement of the ratchet wheel by said pawl. As shown, said bolts normally project through the periphery of the retrieving sheave, and through oppositely disposed apertures therefor in the casing 7 of the retriever, rigidly locking the retrieving sheave from rotation.

A powerful retrieving spring 46 is secured within the casing in the boss 10, and, as shown, is also a flat spiral spring, one end of which is rigidly engaged to the sleeve 14 and the other end of which is rigidly engaged on a pin 47 set in the adjacent face of the retrieving sheave as shown in Figs. 7 and 13, said spring being arranged and directed in said casing so that the tension thereof when wound is directed to correspond with the draft of the springs 24 and 35 in the respective sheaves.

The operation is as follows: The retriever is adjusted by first winding up the retrieving spring 46 to exert a powerful tension upon the retrieving sheave to wind up the end of the retrieving line thereon, which is secured thereto. Said spring may be readily wound to the desired tension by means of a spanner which engages in apertures 48 in the flange of the sleeve 14, the set screws 49 whereby said sleeve is secured to the head of said boss being of course first removed, to be returned to place to rigidly engage the sleeve from reverse rotation after sufficient tension is given said spring. The spring 35 for actuating the pawl and locking bolts is next wound to a relatively high tension, this being accomplished by removing the set screws 16 from engagement between said sleeves, and rotating said sleeve 15 by means of a spanner engaging in the apertures 50 shown in the end of said sleeve in Fig. 3.

When sufficient tension is attained in said spring 35, the set screws 16 are returned to place, rigidly locking said sleeve from reverse rotation. The spring 24 for the take-up sheave is next wound to a relatively light tension, as compared with either the retrieving spring 46 or the spring 35. This is accomplished by releasing the set screw 19 and rotating the shaft 18 by means of a suitable tool engaged in the slot therefor in the end of said shaft, and the desired tension having been attained, returning the set screw 19 to place.

As now assembled and adjusted, the tension on the spring 35, which may be termed the releasing spring, is much greater than on the take-up spring 24, and the retrieving sheave 30—31 is positively locked from any movement whatever by means of the bolts 43, as illustrated in Figs. 12 and 15. In consequence, such relatively slow upward and downward movements of the trolley pole as are occasioned by the ordinary sag in the trolley wire between supports, or by other normal running conditions, are compensated by the take-up sheave 21—22 under the tension of its spring 24, the end of the retrieving line 28, secured to said sheave, winding on and off said take-up sheave with such movements of the trolley, to keep a light tension at all times upon said retrieving line, the movements being sufficiently slow to enable the inertia of the take-up sheave and the tension of its spring to be readily overcome.

Should the trolley wheel slip from the trolley wire, however, the conditions instantly become radically different. The pole, under the influence of its heavy spring 51, flies violently upward, jerking the sheave 6 therewith and violently jerks the bight of the retrieving line, such movement being so violent that sufficient pull is exerted upon the casing of the releasing spring 35 as to rotate the same against the tension of its spring. This forces the pin 41 down over the pawl 39, bringing the same into engagement with the ratchet wheel 29, and securing the take-up and retrieving sheaves rigidly together to move in unison. Said movement of said casing at the same moment retracts the bolts 43 out of engagement with the casing 7, whereupon both the take-up and retrieving springs receive a powerful impulse from the retrieving spring 46, thus released, the tension upon which is amply sufficient to wind up the retrieving line on said sheaves, not only arresting the further upward movement of the trolley pole, but actually pulling the same downwardly to a point sufficiently low to clear the supports for the trolley wire, and holding the same in such position until released manually.

The take-up and retrieving is accomplished instantaneously after the trolley wheel leaves the wire, the action being very rapid owing to the downward draft being applied to both ends of the retrieving line 28, which are both wound simultaneously about the respective sheaves.

The retriever may again be set and the trolley wheel returned to the wire, or, if preferred, and this found convenient, the chains 27, 38, whereby the ends of the retrieving line are engaged on the respective sheaves, may be released from said retrieving line, first having been engaged in the respective slots therefor, and the retriever may be then removed from the end of the car and another like retriever substituted in its stead, properly set and adjusted, and the ends of the retrieving line made fast as before described with the chains of said device.

It is to be understood that the particular means for tensioning the various springs may be varied as convenience may require, and that numerous details of the construction may be varied. I have shown but a preferred form of my invention, and it is to be understood that I do not purpose limiting the patent granted on this application otherwise than necessitated by the prior art.

I claim as my invention:

1. A trolley retriever comprising a retrieving sheave normally locked from action, a take-up sheave, a retrieving line fastened at its ends to both sheaves, a sheave in the bight thereof to which the trolley rope is attached, a spring constantly acting on the take-up sheave to receive the slack of the retrieving line, a powerful spring tensioned to rotate the retrieving sheave to take up at the other end said retrieving line spring actuated means acting to release the retrieving sheave for rotation, and means acting to rigidly connect said sheaves to rotate together when the trolley rope is jerked.

2. In a trolley retriever the combination with a spring impelled, constantly acting take-up sheave, a retrieving line engaged at one end thereto, a normally inert retrieving sheave, to take up the other end of said retrieving line, a sheave in the bight of said line to which the trolley rope is attached, a tensioned retrieving spring normally held from action, mechanism operated by jerking the trolley rope to release said spring, and means locking said sheaves together to rotate simultaneously to take up the retrieving line from both ends thereof and draw the trolley pole downwardly.

3. In a device of the class described the combination with a trolley rope, of a sheave thereon, a retrieving line engaged through the sheave, a spring impelled take up sheave for one end of the retrieving line, a normally locked retrieving sheave, a retrieving spring tensioned to rotate the retrieving sheave, a release mechanism in the retrieving sheave, the other end of the retrieving line being attached to said mechanism, and acting to release the retrieving sheave when actuated, and a pawl and ratchet on the respective sheaves adapted to be brought into engagement by the releasing mechanism simultaneously with the release of the lock whereby excessive draft on the retrieving line actuates the release mechanism to wind said retrieving line at both ends around said sheaves.

4. In a device of the class described a shaft, a plurality of sheaves rotatable thereon, springs affording a resilient connection between said shaft and sheaves, means for positively locking one of said sheaves from rotation, and mechanism adapted to lock said sheaves together when said latter sheave is released.

5. In a device of the class described a plurality of rotatable sheaves, members positively locking one thereof from rotation, mechanism for releasing said locking members, and means locking said sheaves together after release of said locking members.

6. In a device of the class described a casing, a shaft therein, sheaves independently rotatable thereon, springs secured to said sheaves and said shaft to control the movement of the sheaves thereon, mechanism adapted to lock one of said sheaves from rotation, spring controlled means for releasing said mechanism, and cam actuated means for locking said sheaves together.

7. In a device of the class described a casing, a plurality of sheaves independently rotatable therein, means adapted to lock said sheaves together, mechanism adapted to lock one of said sheaves from rotation, and a member adapted to release said locking mechanism and actuate said locking means to permit simultaneous rotation of said sheaves.

8. In a device of the class described a casing, sheaves rotatably mounted therein, a spring for each adapted to control the movement thereof, mechanism adapted to lock said sheaves together, means locking one of said sheaves from rotation, and a spring controlled member adapted to release said locking means and lock said locking mechanism adapting the rotation of the locked sheaves to be controlled by said springs and said spring controlled member.

9. In a device of the class described a casing, sheaves rotatable therein, a pawl and ratchet adapted to lock said sheaves together, bolts adapted to engage said casing to lock one of said sheaves from rotation, and a member adapted to release said bolt mechanism and actuate said ratchet means to permit simultaneous rotation of said sheaves.

10. In a device of the class described a casing, sheaves rotatably mounted therein, a spring adapted to control the movement of each, a pawl and ratchet mechanism adapted to lock said sheaves together, bolts locking one of said sheaves from rotation, and spring controlled cam members adapted to simultaneously release said locking bolts and lock said locking mechanism.

11. In a device of the class described a casing, a plurality of normally unconnected sheaves therein, a spring contained within one of said sheaves to resist rotation thereof, a line with one end thereof connected to said sheave adapted to be wound thereon, a casing within the other of said sheaves, a spring within said casing to resist movement thereof, a pin secured in said casing adapted to project through a slot in said sheave, and with the other end of said line secured thereto, a strong tensioned spring connected to said latter sheave and secured within said casing, locking bolts adapted to prevent rotation of said latter sheave under the impulse of said spring, and means secured on said casing within said sheave to retract said locking bolts and to permit rotation of said latter sheave under the impulse of said strong spring.

12. In a device of the class described a plurality of sheaves normally unconnected, means connecting the same together a spring contained within one of said sheaves and connected thereto to resist rotation thereof, a casing rotatable within the other of said sheaves, and a spring contained therein and connected thereto to resist rotation of said casing, a strong spiral spring connected to said latter sheave adapted to rotate the same when said sheaves are connected together, and individual means for tensioning each one of said springs independently of the other as desired.

13. In a device of the class described a plurality of normally unconnected sheaves, a spring actuated casing within one of said sheaves, mechanisms for connecting said sheaves together, means on said spring impelled casing for actuating said latter mechanism, and a spiral spring adapted to rotate said sheaves in locked relation.

14. In a device of the class described a plurality of sheaves normally unconnected and capable of independent rotation, a spring for each of said sheaves adapted to resist rotation thereof, locking mechanism for one of said sheaves holding the same normally at rest against the tension of its spring, a cable having its respective ends connected to said respective sheaves, and trained through a trolley rope permitting the fluctuation in tension thereon to be resisted by said spring controlled freely rotatable sheave, and mechanism actuated by sudden jerks of the trolley rope to entrain said sheaves together and to release said locking mechanism, permitting both of said sheaves under the impulse of said springs to wind up the ends of the cable thereon simultaneously.

In testimony whereof I have hereunto subscribed my name in the presence of two subscribing witnesses.

JAMES E. GUNDRY.

Witnesses:
R. J. GILLESPIE,
HARRIETTE GILLESPIE.

Copies of this patent may be obtained for five cents each, by addressing the "Commissioner of Patents, Washington, D. C."